UNITED STATES PATENT OFFICE.

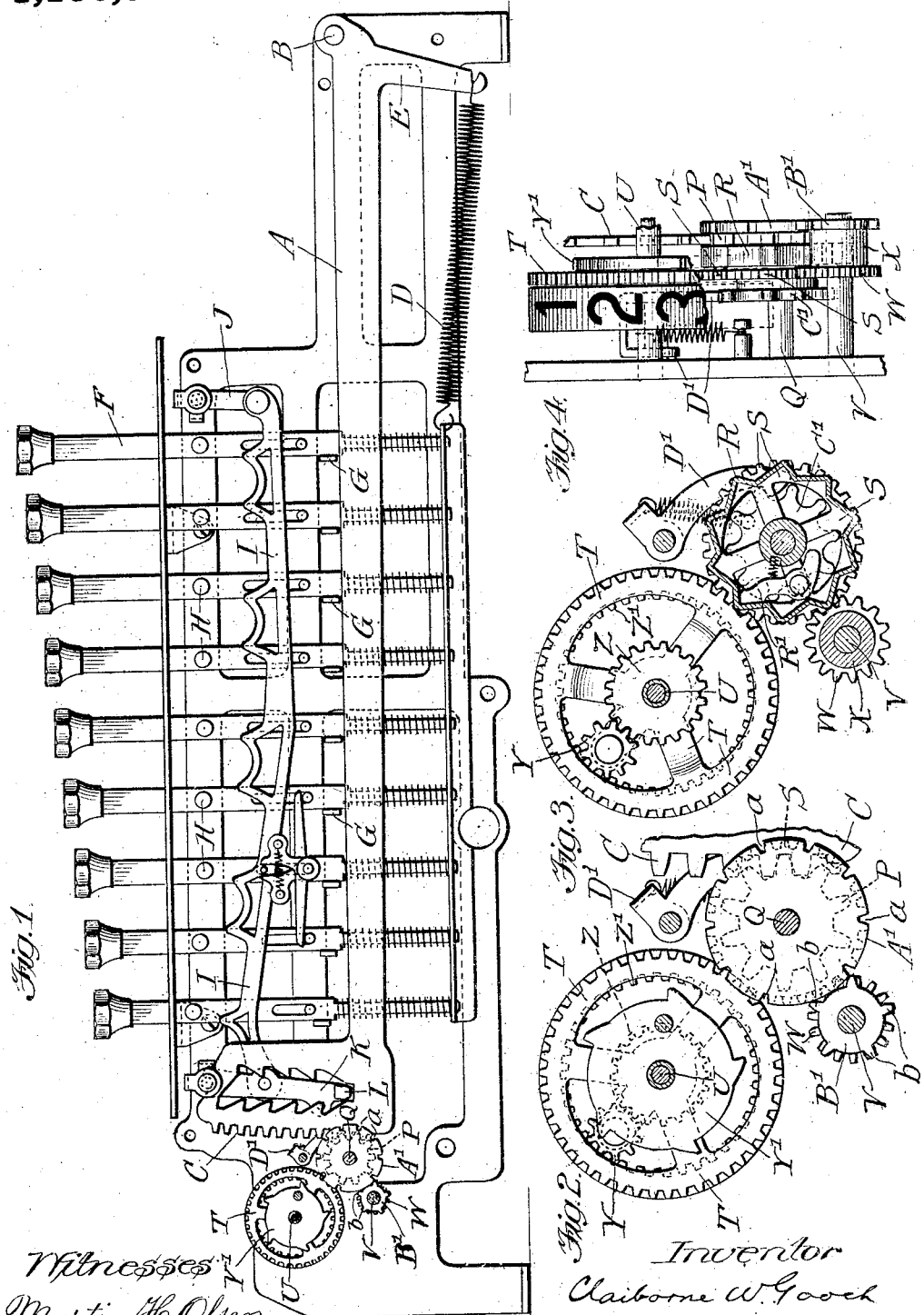

CLAIBORNE W. GOOCH, OF DETROIT, MICHIGAN, ASSIGNOR TO BURROUGHS ADDING MACHINE COMPANY, OF DETROIT, MICHIGAN, A CORPORATION OF MICHIGAN.

CONTROLLING DEVICE FOR ADDING-MACHINES AND THE LIKE.

1,150,937. Specification of Letters Patent. Patented Aug. 24, 1915.

Application filed August 31, 1914. Serial No. 859,475.

*To all whom it may concern:*

Be it known that I, CLAIBORNE W. GOOCH, a citizen of the United States, residing at Detroit, in the county of Wayne and State of Michigan, have invented a certain new and useful Controlling Device for Adding-Machines and the like, of which the following is a description, reference being had to the accompanying drawings, forming part of this specification.

My invention has for its object the provision of simple and efficient means for controlling the movements of the driven member of a pair of driving and driven members having an interposed driving connection which causes the driven member to be turned in one direction by and with the driving member but not in the other—such, for instance, as a ratchet-and-pawl connection— such control serving to prevent the driven member from running ahead of the driving member during the actuating movement of the latter, and to prevent it from being carried beyond the point to which it is positively moved by the driving member, under any momentum which it may acquire or be given during the actuating movement of the driving member.

It has been designed primarily for use in adding and calculating machines and the like, in which a reciprocating actuator of some sort is employed to oscillate a driving member upon an axis, and in which the movements of said driving member in one direction are communicated through a ratchet-and-pawl or similar connection to a numeral wheel, to cause the latter to be turned in one direction by and with the actuator and driving member but not in the other, and its purpose in such employment is to prevent the numeral wheel from running ahead of the driving member and actuator during the actuating movement of said parts, and from being overthrown or carried by its own momentum beyond the point to which it is positively moved by the actuator and driving member, at the end of the actuating movement of the latter. Its utility, however, is not restricted to such employment of it in adding and calculating and similar machines, and it may be employed to advantage wherever it is desired to so control the movements of the driven member of such a pair of driving and driven members.

In its simplest form my novel controlling device comprises a locking disk or wheel turning with the driving member, and a coöperating locking wheel turning with the driven member. The locking wheel turning with the driven member is provided with a plurality of equi-distant teeth, and the locking disk or wheel turning with the driving member is provided with a plurality of coöperating notches. The locking disk or wheel turning with the driving member is free to turn independently of the locking wheel turning with the driven member, and does so during the movement of the driving member in one direction, but the locking wheel turning with the driven member cannot turn without turning the locking disk or wheel associated with the driving member, and it does turn with the driving member, and in unison with it, during the movement of such member in one direction.

Inasmuch as the ratchet-and-pawl connection between the driving and driven members permits the driving member to turn in one direction independently of the driven member but compels the driven member to turn with the driving member during the movement of the latter in the opposite direction, and inasmuch as the locking wheel associated with the driven member cannot turn excepting in unison with the locking disk or wheel associated with the driving member, it follows that during the actuating movement of the parts (*i. e.*, while the driving member is turning the driven member with it through the medium of the ratchet-and-pawl connections between the two) the driving and driven members are locked together by the coöperation of the two locking wheels, and are thereby compelled to move in unison with each other, so that it is impossible for the driven member to run ahead of or get out of step with the driving member under any momentum which it may acquire, and it also follows that when the actuating movement of the parts is completed and the driving member comes to rest the locking of the driven member to the driving member (through the coöperation of the two locking wheels) will prevent the driven member from being carried on forward by its own momentum beyond the point to which it has been positively moved by the driving member.

In the employment of my invention in an adding and calculating machine, for the purpose above described, the driven member of the pair of driving and driven members referred to is geared to the numeral wheel, and transmits its movements to such wheel, so that the control exercised over the driven member by my novel controlling device serves to control the movements of the numeral wheel and prevent any inaccuracy therein.

I have illustrated my invention as employed in an adding and calculating machine of familiar type, shown in the Horton Patent No. 1,016,501 and the Pasinski Patent No. 1,023,168, but it will be understood, both from what has been said and from the explanation hereinafter given, that it is equally applicable to adding and calculating machines of other types, as well as to a still wider range of use.

In the accompanying drawings, Figure 1 represents a side elevation of a single bank or section of an adding and calculating machine such as that above referred to, with my invention embodied in it; Fig. 2 is an enlarged detail side elevation of the parts shown at the front end of the machine in Fig. 1; Fig. 3 a similar view in a plane farther to the left, through the internal ratchet, to expose the pawl within said ratchet and the pinion beyond, which carries said pawl; and Fig. 4 a detail front elevation of some of the parts shown in Figs. 1, 2 and 3.

The same letters of reference are used to indicate corresponding parts in the several views.

In the particular construction disclosed in the drawings, A represents the usual actuating lever or "column-actuator" of the machine, of which there is one for each bank or row of keys, and which in the present instance is shown fulcrumed at its rear end upon a rod B and provided at its front end with a gear-toothed sector or rack C. A coiled spring D connected at its rear end to a depending arm E of the lever A, and at its front end to a frame plate of the machine, serves to yieldingly hold the lever in and return it to its normal position, shown in the drawing, after each depression of it by one or another of the operating keys F of the machine. These keys are suitably guided vertically in the framework of the machine, and are provided with laterally-projecting lugs G overlying the upper edge of the lever A and located at such relative distances from its fulcrum, as well as from its upper edge, as to cause the depressions of the keys to give it the necessary graduated movements corresponding to the values and positions of the respective keys, as usual. The keys F are also provided with laterally-projecting studs H which coöperate with a cam-bar I hung at its rear end upon a link J and pivoted at its front end to a pendant swinging arm K which carries at its lower end a lug or projection L coöperating with teeth formed upon the opposite sides of a vertical slot or open space in the enlarged front end or plate of the lever A whose front edge constitutes the gear-toothed rack C. The purpose of the cam-bar I and its associated parts is to accurately determine and limit the downward movements of the front end of the lever A under the operations of the several keys, but as it is fully illustrated and described in the patents above referred to, and constitutes no part of my present invention, it need not be further described.

The rack C carried by the front end of the lever A meshes with a pinion P which is mounted to turn upon a shaft Q, and which is therefore turned in one direction (clockwise) during the downward movement of the rack, at the depression of any key, and in the reverse direction at the return upward movement of the rack. Such pinion, so engaging and turned by the rack of the actuating lever, constitutes the driving member of the combination of elements heretofore referred to, as they are employed in the machine disclosed in the drawings. In the side elevation of the parts in Figs. 1 and 2 the pinion P is beyond and consequently behind the locking disk or wheel A' of the controlling device, hereinafter described, and is therefore shown in dotted lines, but it is shown in full lines, in front elevation, in Fig. 4, where it will be seen that it is located immediately adjacent an internal ratchet R. This ratchet and the pinion P and locking disk A' of the controlling device are secured together and turn in unison as one element. Located immediately beyond and beside the ratchet R, as the parts are viewed in Figs. 1, 2 and 3, and immediately at the left of it in Fig. 4 is a pinion S which meshes with a gear wheel T mounted upon the numeral wheel shaft U, located above and in front of the shaft Q. The pinion S carries upon its right side, within the internal ratchet R, a spring-pressed pawl R' which engages the internal teeth of the ratchet, Fig. 3, and causes the ratchet to carry the pinion S with it during its movement in one direction but not in the other. The relation of the ratchet and pawl is such in the present instance that the ratchet slips idly over the tooth of the pawl during the downward movement of the front end of the actuating lever A and consequent turning of the parts in a clockwise direction, and engages the pawl and carries the pinion S with it during the return movement of the parts in the opposite direction.

Mounted upon a shaft V, located below and in front of the shaft Q, and meshing with the pinion S is a pinion W which is fast upon the left-hand end of a hub or sleeve X, Fig. 3, upon whose right-hand end, Figs. 1, 2, and 4, is secured the second locking wheel B' of the coöperating pair of locking wheels A', B'. The locking wheel B' is in this instance provided with five equi-distant teeth b, and the locking disk or wheel A' is provided with a plurality of correspondingly spaced notches a which coöperate with the teeth of the wheel B'. The disk A' is free to turn independently of the wheel B' when the latter is at rest, and does so during the clockwise movement of the parts produced by the downward movement of the front end of the actuating lever A. The wheel B', however, cannot turn independently of the disk A', but on the contrary is locked from movement in either direction by the disk A' when the latter is at rest. When, however, the locking wheel B' is turned in a clockwise direction and the disk A' in the reverse direction, as they are at the return upward movement of the actuating lever A, the successive teeth b of the wheel B' will engage the successive notches in the periphery of the disk A', and the wheel and disk will turn together in unison but in reverse directions. During such movements of the parts it is the engagement of the teeth of the wheel B' with the notches in the periphery of the disk A' which permits the wheel B' to turn, since in the absence of such notches the wheel B' would be at all times locked from movement by the periphery of the disk A'. The coöperation of the teeth of the wheel B' with the notches in the periphery of the disk A' therefore serves to lock or couple the wheel and disk together during their turning movements above described, with the result that it is impossible for the wheel B' (or any part geared to and turning with it) to run ahead of or become displaced in relation to the disk A'. Inasmuch as the wheel B' is directly geared to the pinion S driven by the ratchet R at the return upward movement of the forward end of the actuating lever A, it therefore follows that the pinion S is so locked or coupled to the disk A' that it cannot run ahead of or become displaced in relation to said disk at such movement of the parts; and inasmuch as the pinion S is permanently in mesh with the gear wheel W by which the numeral wheel is driven, it further follows that the numeral wheel itself is so connected with the locking disk A' (and consequently with the actuating lever A by which said disk is turned) that it is compelled to move in perfect unison with said lever during the return upward actuating stroke of the latter, and cannot run ahead of or become displaced in relation to said actuating lever either during or at the end of such movement of the lever. In the present instance the locking disk A' is provided with nine notches a located one-tenth of the circumference of the disk apart, the tenth notch being omitted and the periphery of the disk being left continuous between what may be termed the ninth and first notches. The resulting operation of the parts would be substantially the same if the disk were provided with ten notches, and the tenth notch has been omitted in the construction shown because it is unnecessary. When omitted, however, the continuous or unnotched surface of the disk A', between the first and ninth notches, lies opposite the tooth b upon the upper right-hand side of the locking wheel B' when the latter comes to rest, and the momentum of said wheel and the parts in gear with it is arrested by the contact of such tooth with the continuous surface of the disk at such point and such contact serves to positively lock the parts against any overthrow or excess movement. If a tenth notch were present in the disk A' at the point of such contact or engagement of the tooth of the wheel B', the result would be the same, but the tooth would engage such notch and tend to turn the disk A' onward in the direction in which it had been moving, such movement of it being prevented, however, by its gear connection with the rack upon the front end of the actuating lever and the positive arrest of the latter at the end of its upward movement.

It has heretofore been common, in machines of this general character, to provide means for arresting the movement of the numeral wheel and preventing overthrow or excess movement of it at the end of the return upward movement of the actuating lever A, but such provision does not prevent the numeral wheel from running ahead of the actuating lever and becoming displaced in relation to it during the return upward movement of the lever and before it reaches the end of such movement, and it has therefore been possible, in some machines of this class, to so manipulate the machine, by arresting the actuating lever during its return upward stroke, as to produce an excessive movement of the numeral wheel and consequent inaccuracy in the operation of the machine. As will be understood from the description which has been given of it, my novel controlling device removes the possibility of so manipulating the machine, since it serves to control the movement of the numeral wheel, and prevent any irregular or excessive movement of it, not only at the end of the return upward stroke of the actuating lever, but at all times during such movement.

It is immaterial to the use and operation of my novel controlling device what sort of gearing may be interposed between the pinion S and the numeral wheel, but in the present instance the gear connection between them is the same as that shown and described in the Horton and Pasinski patents heretofore referred to. That is to say, each of the pinions S meshes with a gear wheel T located upon the numeral wheel shaft U and carrying a planet gear Y which meshes at its inner side with a sun-gear Z on the numeral wheel shaft U and at its outer side with an internal gear Z' fast upon the numeral wheel. The sun-gears Z are normally stationary (i. e. except during carrying operations) with the result that the movements of the gear wheel T will be transmitted through the planet gear, and its coöperation with the sun-gear and the internal gear upon the numeral wheel, to the latter, as fully described in the patents before referred to.

In Figs. 1 and 3 of the drawings is shown one of the escapement disks Y' of the carrying mechanism, but in the single bank machine from which said drawing was made said escapement disk is secured in fixed position and is present merely as a support for the sun-gear Z, which is secured to or formed upon its farther or left-hand side, Fig. 3, and performs no function as a part of the carrying mechanism.

Rotation of the pinion S (and consequently of the pinion W and locking wheel B') in reverse direction, is prevented by a toothed locking wheel C' and coöperating pawl D', Fig. 3, the wheel being fastened upon the hub of the pinion S at the left of the latter, Fig. 4, and the locking pawl being spring-pressed into engagement with the wheel.

It is necessary, in the zeroizing or clearing operation of machines of this character. when equipped with my novel controlling device, to provide means for disengaging the locking wheel B' and locking disk A' from each other during such operation, in order that the pinions S and parts in gear with them may be turned independently of the locking disks A', pinions P and actuating levers A, and in the complete machines in which I have embodied my present invention, therefore, I have made provision for automatically or incidentally disengaging said locking wheels and disks at each zeroizing or clearing operation. Inasmuch, however, as I have not undertaken to illustrate or describe the clearing operation of the machine in the present case I have not considered it necessary to illustrate or describe the provision for disengaging the locking wheels and disks at such operation.

Having thus fully described my invention, I claim:

1. The combination, with an oscillating driving member and a driven member turned thereby in one direction, of a pair of locking members turning with the driving and driven members, respectively, and coöperating with each other to prevent movement of the driven member independently of the driving member; substantially as described.

2. The combination, with an oscillating driving member and a driven member turned thereby in one direction, of a notched locking disk turning with the driving member and a toothed wheel turning with the driven member and coöperating with the notched disk to prevent movement of the driven member independently of the driving member; substantially as described.

3. The combination, with an oscillating driving member, a driven member, and a ratchet-and-pawl connection between the two for causing the driving member to carry the driven member with it in one direction, of a pair of locking members turning with the driving and driven members, respectively, and coöperating with each other to prevent movement of the driven member independently of the driving member; substantially as described.

4. The combination, with an oscillatory driving member, a driven member, and a ratchet-and-pawl connection between the two for causing the driving member to carry the driven member with it in one direction, of a notched locking disk turning with the driving member, and a toothed wheel turning with the driven member and coöperating with the notched disk to prevent movement of the driven member independently of the driving member; substantially as described.

5. The combination, with a reciprocating actuating rack, a pinion meshing therewith and constituting a driving member, a second pinion, constituting a driven member, means intermediate the two pinions for causing the driving pinion to carry the driven pinion with it in one direction, and a pair of locking members turning with the respective pinions and coöperating with each other to prevent movement of the driven pinion independently of the driving pinion; substantially as described.

6. The combination, with a reciprocating actuating rack, of a driving pinion meshing therewith, a driven pinion, a ratchet-and-pawl connection between the two for causing the driving pinion to carry the driven pinion with it in one direction, and a pair of locking members turning with the respective pinions and coöperating with each other to prevent movement of the driven pinion independently of the driving pinion; substantially as described.

7. The combination, with a reciprocating actuating rack, of a driving pinion meshing therewith, a driven pinion, means intermediate the two for causing the driving pinion to carry the driven pinion with it in one direction, a notched locking disk turning with the driven pinion, and a toothed wheel turning with the driven pinion and coöperating with the locking disk to prevent movement of the driven pinion independently of the driving pinion; substantially as described.

8. The combination, with the driving pinion P, driven pinion S, and the ratchet-and-pawl connection between the two for causing the pinion P to carry the pinion S with it in one direction, of the notched locking disk A′ turning with the pinion P, and the toothed wheel B′ turning with the pinion S and coöperating with the disk A′ to prevent movement of the pinion S independently of the pinion P; substantially as described.

9. The combination, with the reciprocating actuating rack C, the driving pinion P meshing therewith, the driven pinion S, and the ratchet-and-pawl connection between the two, of the locking disk A′ turning with the pinion P, and the toothed wheel B′ turning with the pinion S and coöperating with the disk A′ to prevent movement of the pinion S independently of the pinion P; substantially as described.

10. The combination, with the reciprocating actuating rack C, the pinion P meshing therewith, the locking disk A′ fastened upon one side of the pinion P, the internal ratchet R fastened upon the opposite side of the pinion P, the pinion S located beside the ratchet R and carrying the pawl R′ coöperating therewith, the pinion W meshing with the pinion S, and the toothed wheel B′ turning with the pinion W and coöperating with the disk A′ to prevent movement of the pinion S independently of the pinion P; substantially as described.

CLAIBORNE W. GOOCH.

Witnesses:
R. S. MIELERT,
A. J. LAUVER.